United States Patent [19]

Daguet et al.

[11] 3,891,803

[45] June 24, 1975

[54] SINGLE SIDEBAND SYSTEM FOR DIGITALLY PROCESSING A GIVEN NUMBER OF CHANNEL SIGNALS

[75] Inventors: Jacques Lucien Daguet, St. Maur; Maurice Georges Bellanger, Antony; Guy Pierre Lépagnol, Sceaux, all of France

[73] Assignee: Telecommunications Radioelectriques T.R.T., Paris, France

[22] Filed: June 1, 1973

[21] Appl. No.: 366,073

[30] Foreign Application Priority Data

June 15, 1972 France .............................. 72.21646

[52] U.S. Cl. .............................................. 179/15 FS

[51] Int. Cl. .............................................. H04j 1/18

[58] Field of Search ........ 179/15 FS, 15 FO, 15 BC, 179/1 SA, 15.55 R

[56] References Cited

UNITED STATES PATENTS

| | | | |
|---|---|---|---|
| 3,573,380 | 4/1971 | Darlington | 179/15 FS |
| 3,605,019 | 9/1971 | Cutter | 179/15 FD |
| 3,676,598 | 7/1972 | Kurth | 179/15 FD |
| 3,808,412 | 4/1974 | Smith | 179/15 BC |

OTHER PUBLICATIONS

*IEEE Spectrum;* Dec., 1967; "The Fast Fourier Transform" by Brigham et al., pp. 63–70.

*Primary Examiner*—David L. Stewart

*Attorney, Agent, or Firm*—Frank R. Trifari; Henry I. Steckler

[57] ABSTRACT

A single sideband system for digitally processing a given number of analog channel signals, provided with: a digital filter to which filter coefficients are applied which characterized a lowpass filter having a cut-off frequency which is equal to half the bandwidth of the channel signals; a fast fourier transformer to which a number of carrier signal functions is applied, which number is at least equal to twice the number of channel signals and each of which represents a carrier frequency, each frequency being an even multiple of the cut-off frequency of the lowpass filter.

4 Claims, 9 Drawing Figures

SINGLE SIDEBAND SYSTEM FOR DIGITALLY PROCESSING A GIVEN NUMBER OF CHANNEL SIGNALS

The invention relates to a single sideband system for digitally processing a given number of analog channel signals each having a given bandwidth.

This digital processing may consist of, for example, the conversion of a given number of base band signals (for example, speech signals in the frequency band of 0–4 kHz) into a single sideband frequency division multiplex signal. Alternatively, this digital processing may consist of the conversion of a given single sideband frequency division multiplex signal into the original base band signals.

The single sideband systems suitable for the former digital processing method, referred to as single sideband frequency division multiplex systems, and the single sideband systems suitable for the latter digital processing method, referred to as a single sideband frequency division demultiplex systems are, however, unequal in structure.

An object of the invention is to provide a single sideband system of the type described above which is suitable for each of the two above-mentioned digital processing methods.

According to the invention this single sideband system includes an input circuit which is provided with a converter for sampling and converting the channel signals into a number of digital signals; a cascade arrangement of a fast fourier transformer and a digital filter, the said digital signals being applied to said cascade arrangement; a source for a given number of filter coefficients which are applied to said digital filter, said filter coefficients characterizing the transfer function of a lowpass filter having a cut-off frequency which is equal to half the bandwidth of said channel signals; a source for a given number of carrier signal functions applied to said fast fourier transformer, said number of carrier signal functions being at least equal to twice the number of channel signals, said carrier functions representing carrier frequencies each being an even multiple of the cut-off frequency of the said lowpass filter.

The invention and its advantages will now be described in greater detail with reference to the accompanying Figures.

Figure 1:
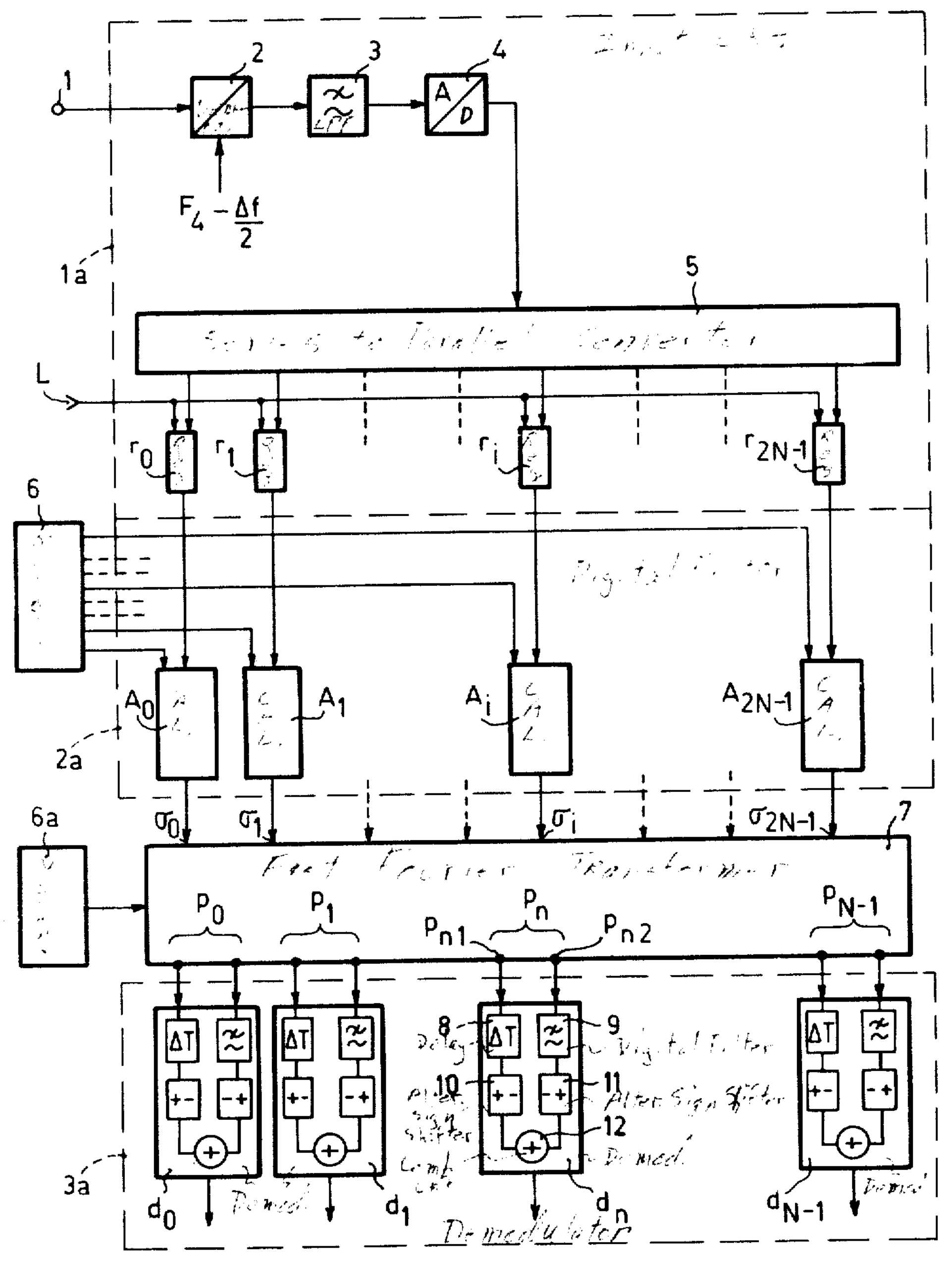
FIG. 1 shows a single sideband system for converting a frequency division multiplex signal into the corresponding baseband channel signals.
Figure 4:
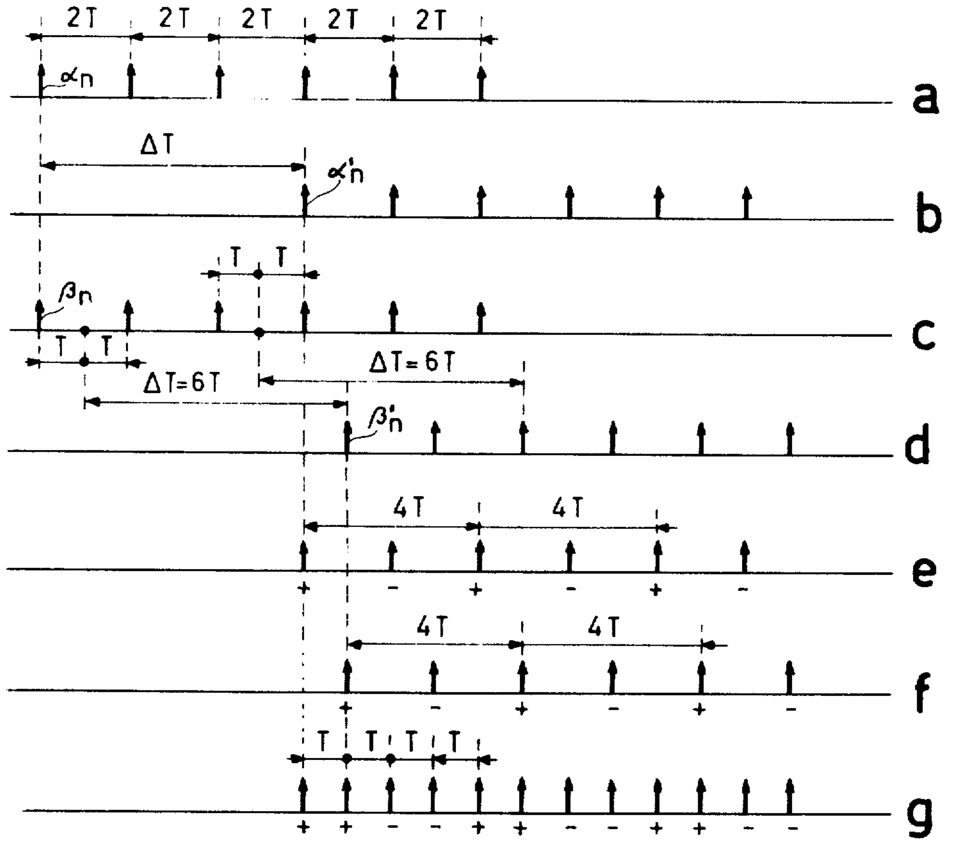
Figure 5:
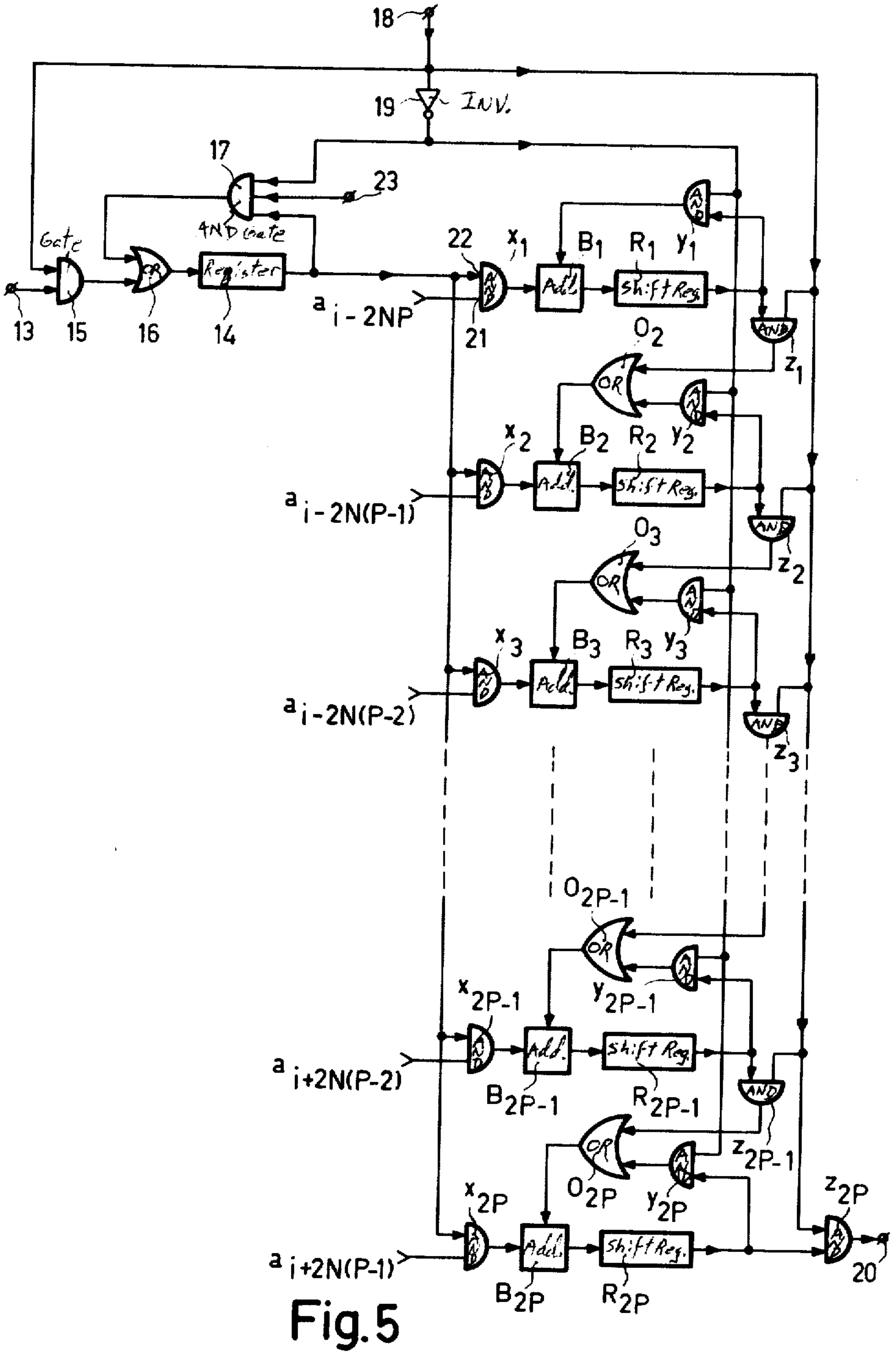
Figure 6:
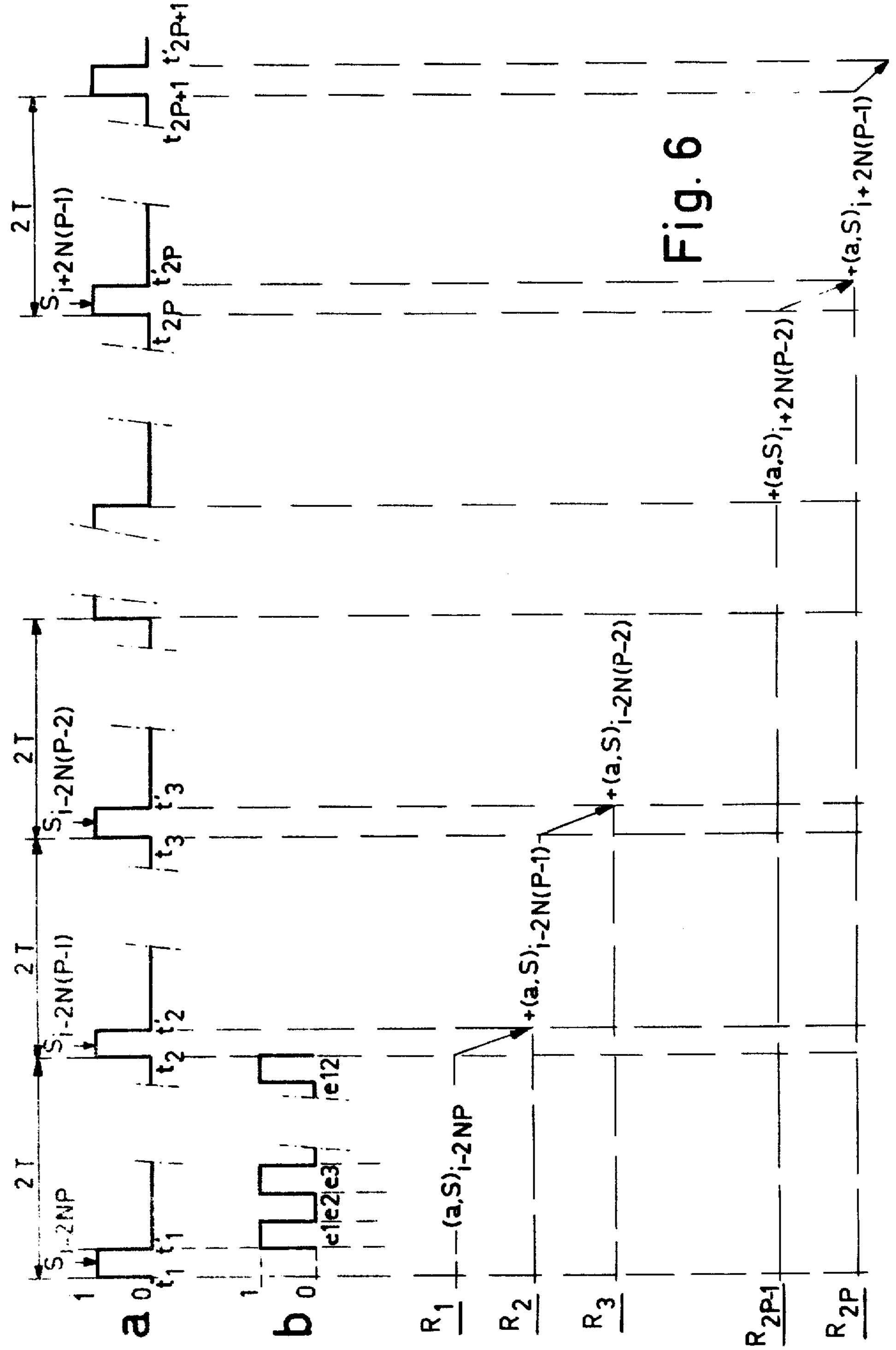
Figure 7:
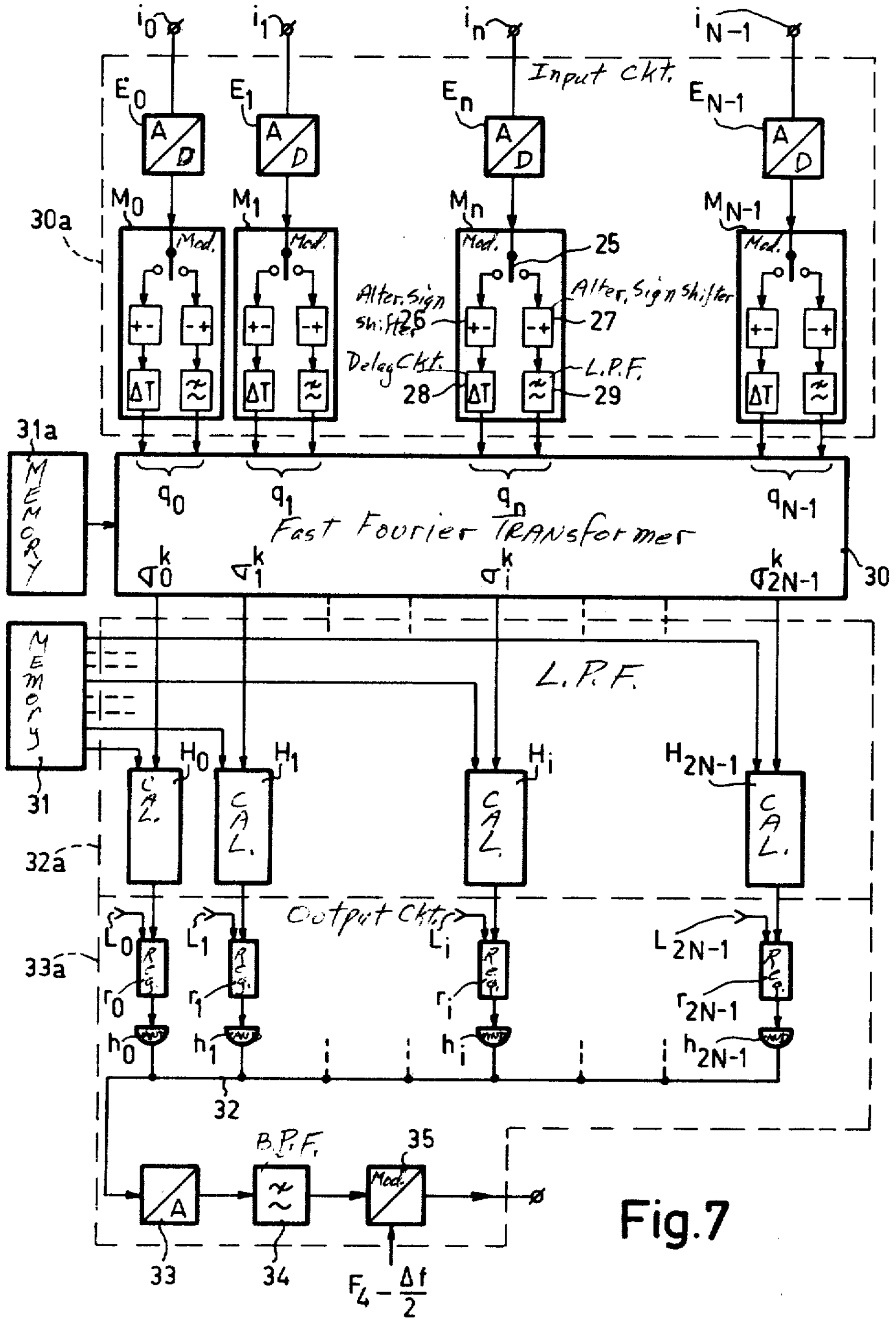
Figure 8:
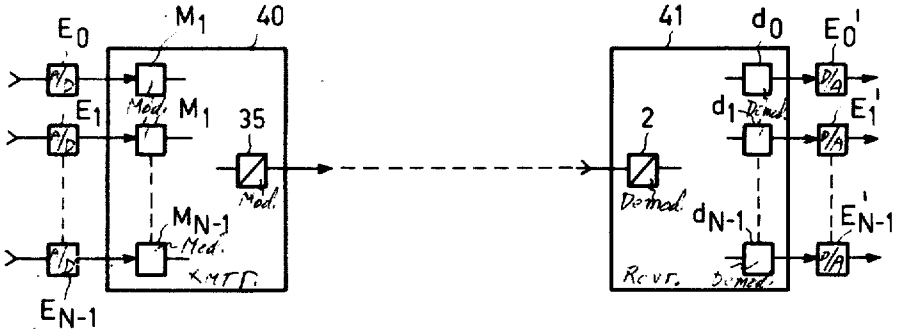
Figure 9:
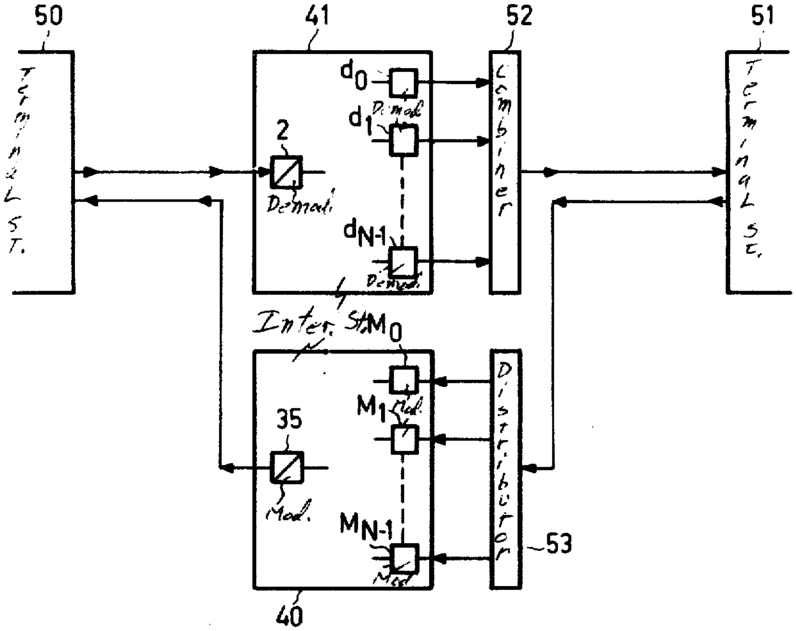

FIG. 4 shows with reference to series of samples the operation of a quadrature modulator shown in FIG. 1 and FIG. 5 shows a detailed embodiment of a calculator (or convolution means) according to FIG. 1 and FIG. 6 shows its operation by means of a diagram, FIG. 7 shows a single sideband system for converting a number of baseband channel signals into a frequency division multiplex signal and FIGS. 8 and 9 show transmission systems provided with a transmitter and a receiver each comprising a single sideband system according to the invention.

Figure 2:
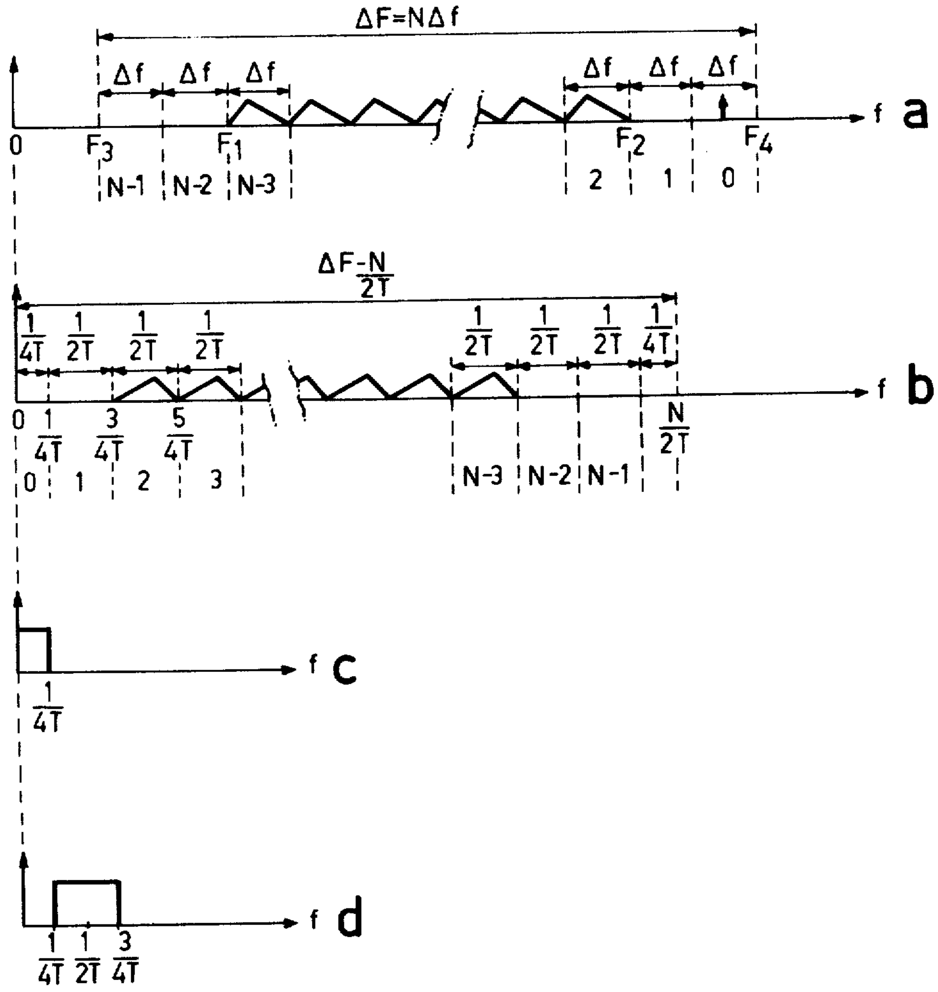
FIG. 2 shows, inter alia, a frequency diagram of the multiplex signal.

FIG. 1 shows a single sideband system adapted for converting a frequency division multiplex of a number of single sideband-modulated channel signals into the corresponding baseband channel signals. For example, this multiplex signal is located in the frequency band $F_1$–$F_2$ of 312 to 552 kHz and is formed by a secondary telephony group of 60 telephony channels each having a bandwidth of 0–$\Delta f$, i.e. 4 kHz. This multiplex signal whose frequency diagram is shown in FIG. 2*a* is applied in the system of FIG. 1 to the input terminal 1 of the input circuit 1*a*. A group of N channels with a bandwidth of $\Delta F = N\Delta f$ in which $N$ is preferably a number equal to an integral power of 2 is formed with idle channels at least one of which adjoins the frequency $F_2$ of the multiplex signal. As is shown in FIG. 2*a* this group of N channels occupies the band ΔF between the frequencies $F_3$ and $F_4$. In this Figure the channels are also enumerated 0 to N−1 in the direction of the decreasing frequencies. A group of 64 channels ($=2^6$) is formed with the said secondary telephony group of 60 channels by introduction of four idle channels located on either side of the frequency band of 312–552 kHz and this group of 64 channels occupies the frequency band of $F_3$–$F_4$, i.e. 304–560 kHz.

This multiplex signal received through the input terminal 1 is applied to the demodulator 2 so as to be demodulated with the aid of a carrier whose frequency is in the center of the idle channel adjoining the highest frequency $F_4$ of the group of N channels. For the multiplex signal having the frequency diagram shown in FIG. 2*a* this demodulation carrier frequency $F_4 - \Delta f/2$ is, for example, 558 kHz and is located in the center of the channel no. 0. The output signal from the demodulator 2 is applied to a lowpass filter 3 which eliminates the upper sideband of the demodulated signal and from which a signal is derived whose frequency diagram is shown in FIG. 2*b*. In this Figure the frequencies are given in the form of the reciprocal of time. There applies that:

$$\Delta f = \frac{1}{2T} \text{ and thus } \Delta F = \frac{N}{2T}$$

Also in the diagram of FIG. 2*b* the N channels are given and enumerated 0–(N−1) in the direction of the increasing frequencies. The channel no. 0 occupies in this case only the frequency band of [0 − 1/4T] Hz.

In an analog-to-digital converter 4 the signal coming from filter 3 is sampled at a frequency 2F = N/T and each sample is converted into a code word of, for example, 12 binary elements (bits).

The series of coded samples is subsequently applied with a frequency of N/T in the input circuit 1*a* to a series to parallel converter 5 which provides 2N interleaved series of samples which are applied to 2N registers $r_o, r_1 \ldots r_{2N-1}$ each having a storage capacity corresponding to one code word. The contents of all registers are simultaneously applied, in the rhythm of a read pulse signal L, at a frequency of 1/2T to a digital filter constituted by 2N calculator members $A_o, A_1 \ldots A_{2N-1}$ to which filter coefficients originating from a memory 6 are applied, which filter coefficients characterize a lowpass filter having a cut-off frequency of 1/4T. Sum signals each proportional to the sum of products of samples and filter coefficients applied to these calculators (or convolution means) A are generated by these calculators at a frequency of 1/2T. The outputs $\sigma_o, \sigma_1 \ldots \sigma_{2N-1}$ of these calculators are applied to a transformer in the form of a Fast Fourier transformer 7 to which carrier signal functions originating from a memory 6*a* are applied and which supplies two series of samples on each of its N independent pairs of output leads $P_0, P_1 \ldots P_{N-1}$, said samples occurring at a frequency of 1/2T, one series of said pairs of series corresponding to the phase component of the signal in a channel and the other series corresponding to the quadrature component of the signal in the relevant channel. In order to obtain the corresponding baseband channel signal from two of such series, the output leads are connected to a demodulator 3*a* and more particularly each pair of output leads P is connected to a quadrature demodulator $d_0, d_1 \ldots d_{N-1}$ each supplying samples of a baseband channel signal at a frequency of 1/T.

Before describing the operation of the system according to FIG. 1 in detail, we still state which operations are to be performed so as to achieve the envisaged object.

In order to select in an ideal manner that portion of the total signal located in the frequency band of 0 – 1/4T corresponding to the channel no. 0, a lowpass filter is to be used with a cut-off frequency of 1/4T and a transfer function of the shape as shown in FIG. 2*c*. The frequency diagram of the total signal is shown in FIG. 2*b*. As is khown the pulse response of such an ideal lowpass filter having this transfer function has a shape which is given by the function:

$$\frac{\sin \pi \frac{t}{2T}}{\pi \frac{t}{2T}}$$

Figure 3:
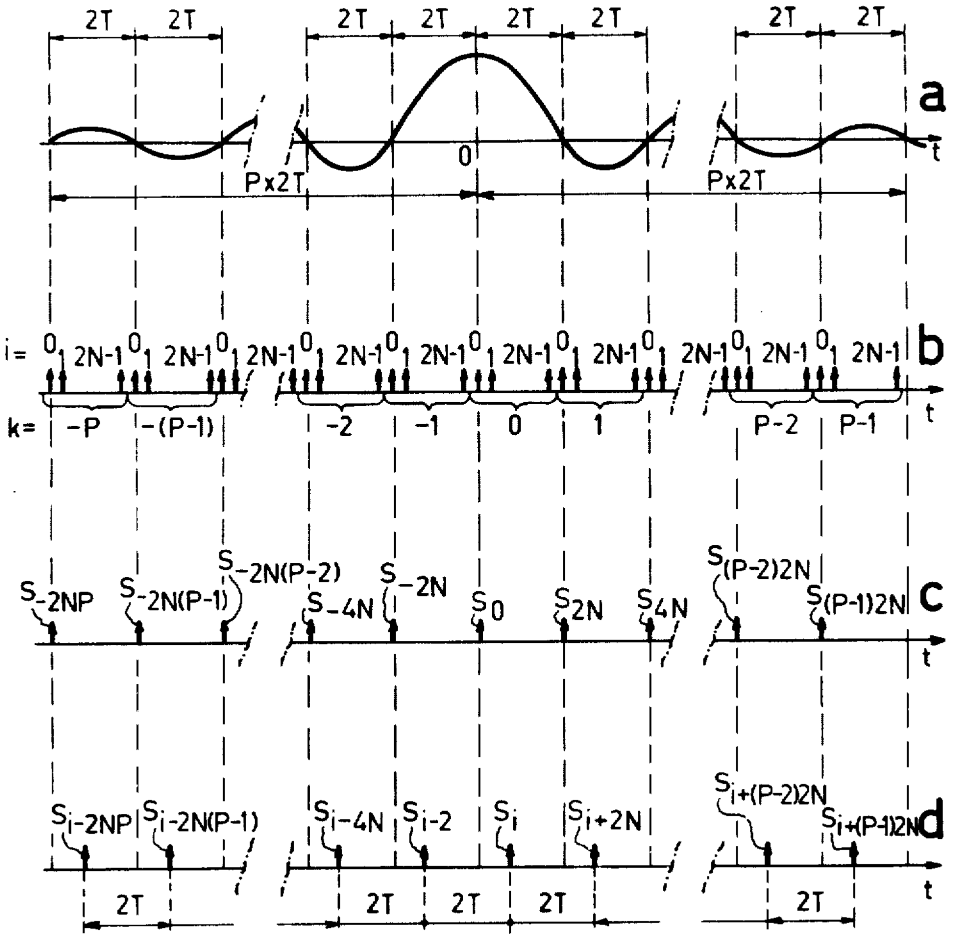
FIG. 3 shows the pulse response of a lowpass filter and series of signal samples process by this response.

This function which is further shown in FIG. 3*a* has a maximum value at the instant $t = 0$ and is zero at the instant $n.2T$ wherein $n = \pm 1, \pm 2, \pm 3 \ldots$ Non-recursive digital filtering means in this case convolving the samples of the multiplex signal occurring at a frequency N/T with the pulse response of the filter. When the samples of the pulse response of the filter are denoted by $a_i$ at the instants when the samples $S_i$ of the multiplex signal occur, this filtering operation is based on the following mathematical expression:

$$Co = \sum_{i=-Q}^{Q} a_i S_i \qquad (1)$$

in which $Q$ is an integer corresponding to the number of samples $a_i$ of the pulse response, which samples will be referred to hereinafter as filter coefficients.

This equation (1) may, however, be given in another form which can be derived from the series of samples of the multiplex signal shown in FIG. 3*b* and from the pulse response shown in FIG. 3*a* of the digital lowpass filter to be realized. This series of samples occurring at a frequency N/T is limited to those samples which occur in a total time interval of 2P time intervals 2T which are symmetrically distributed about the time $t$ = 0. The P × 2N samples located on the side of the positive time and comprising the central sample $S_0$ are denoted by $S_{i+2Nk}$ wherein $i = 1, 2, 3 \ldots 2N-1$ and thus characterizes each of the 2N samples within a time interval 2T. In this expression $k$ assumes all integral values of 0 up to P–1 inclusive and thus characterizes each of the P time intervals located on the side of the positive times. The P × 2N samples which are located on the side of the negative times are likewise denoted by $S_{i+2Nk}$ wherein $k = -1, -2, -3 \ldots -P$. In a corresponding manner the filter coefficients characterizing the values of the pulse response at the instant of occurrence of the samples of the multiplex signal may be represented by $a_{i+2Nk}$. By introducing this manner of writing, equation (1) may be written as follows:

$$Co = \sum_{i=o}^{2N-1} \sum_{k=-P}^{P-1} a_{i+2Nk} S_{i+2Nk} \qquad (2)$$

In order to select the multiplex signal shown in the frequency diagram of FIG. 2*b* that portion located in the frequency band of 1/4T – 3/4T and corresponding to channel no. 1 a filter must be realized which has a transfer functioon of the shape as shown in FIG. 2*d*, i.e. a selection filter having a central frequency of 1/2T and a bandwidth of 1/2T. As is known the transfer function of such a filter is the same as that of the lowpass filter of FIG. 2*c* but is subjected to a frequency shift of $f_o = 1/2T$. As is known a frequency shift of $f_o$ of the transfer function of a filter is equivalent to a multiplication of the pulse response thereof by cos $2\pi t/4T$ for the phase component and by $-\sin 2\pi t/4T$ for the quadrature component.

At the instant $t = i.2T/2N$ wherein $i = 0, 1, 2 \ldots 2N-1$ the phase and quadrature components of the pulse response of the filter shown in FIG. 2*d* are thus represented by:

$$\left\{a_{i+2Nk} \cdot \cos\left(\frac{2\pi}{2T}\,\frac{i.2T}{2N}\right)\right\} \quad \text{and} \quad \left\{-a_{i+2Nk} \cdot \left(\sin \frac{2\pi}{2T}\,\frac{i.2T}{2N}\right)\right\}$$

so that the phase component $\alpha_1$ of the output signal of the filter is given by:

$$\alpha_1 = \sum_{i=o}^{2N-1} \sum_{k=-P}^{P-1} a_{i+2Nk} \cdot \cos \frac{2\pi i}{2N} \cdot S_{i+Nk}$$

and its quadrature component $\beta_1$ is given by:

$$\beta_1 \sum_{i=o}^{2N-1} \sum_{k=-P}^{P-l} a_{i+2Nk} \cdot \sin \qquad \cdot S_{i+2Nk}$$

Since in these expressions for the phase and quadrature components of the output signal of the filter the arguments of the goniometric functions due to the choice of the central frequency of the filter as an even multiple of the cut-off frequency of the low-pass filter of FIG. 2*c*, are exclusively dependent on the variable $i$ and independent of the variable $k$, these expressions may be written as follows:

$$\alpha_1 = \sum_{i=o}^{2N-1} \cos \frac{2\pi i}{2N} \sum_{K=-P}^{P-1} a_{i+2Nk} \cdot S_{i+2Nk}$$

$$\beta_1 \quad \sum_{i=o}^{2N-1} \sin \frac{2\pi i}{2N} \sum_{K=-P}^{P-1} a_{i+2Nk} \cdot S_{i+2Nk}$$

In order to determine simultaneously the phase and the quadrature components of the signal, we will consider the following complex signal:

$$C_1 = \alpha_1 + j\beta_1 = \sum_{i=o}^{2N-1} \exp\,[-j2\pi i/2N] \cdot \sum_{k=-P}^{P-1} a_{i+2Nk} \cdot S_{i+2Nk} \quad (3)$$

Analogously it can be shown that the signal in the $n^{th}$ channel can be selected from the multiplex signal with a bandpass filter whose central frequency is $n$ times the cut-off frequency 1/2T of the lowpass filter according to FIG. 2*c*. Accordingly the output signal $C_n$ of the filter for this $n^{th}$ channel is given by:

$$Cn = \sum_{i=o}^{2N-1} \exp\,[-j2\pi in/2N] \sum_{k=-P}^{P-1} a_{i+2Nk} \cdot S_{i+2Nk} \quad (4)$$

And for the last channel no. N−1 it is:

$$C_{N-1} = \sum_{i=o}^{2N-1} \exp\,[-j2\pi(N-1)i/2N \sum_{k=-P}^{P-1} a_{i+2Nk} \cdot S_{i+2Nk} \quad (5)$$

For all these expressions (2), (3), (4) and (5) for Co, $C_1 \ldots C_n \ldots C_{N-1}$ the second summation is the same. Writing:

$$\sigma_i = \sum_{k=-P}^{P-1} a_{i+2Nk} \cdot S_{i+2Nk} \quad (6)$$

the signals Co, $C_1 \ldots C_n \ldots C_{N-1}$ may be expressed as:

$$Co = \sum_{i=o}^{2N-1} \sigma_i \quad (7)$$

$$C_1 = \sum_{i=o}^{2N-1} \sigma_i.\exp\,[-j2\pi i/2N]$$

$$Cn = \sum_{i=o}^{2N-1} \sigma_i.\exp\,[j2\pi in/2N]$$

$$C_{N-1} = \sum_{i=o}^{2N-1} \sigma_i.\exp\,[-j2\pi i(N-1)/2N]$$

The expressions for Co, $C_1 \ldots C_n \ldots C_{N-1}$ represent in the complex form the signals in the channels 0, 1 . . . $n$ . . . N−1 and the coefficients Co, $C_1 \ldots C_n \ldots C_{N-1}$ may be interpreted as the complex Fourier coefficients of the multiplex signal. These coefficients Co, $C_1 \ldots C_n \ldots C_{N-1}$ have real parts $\alpha_o \ldots \alpha_1 \ldots \alpha_n \ldots \alpha_{N-1}$ and imaginary parts $\beta_o \ldots \beta_1 \ldots \beta_n \ldots \beta_{N-1}$ in which the real part $\beta_n$ corresponds to the phase component of the signal in channel no. $n$, and the imaginary part $\beta_n$ corresponds to the quadrature component of the signal in that channel.

By introducing the function $W = \exp\,[-j\pi/N]$ the equation (7) may be written in a matrix form as follows:

$$\begin{bmatrix} Co \\ C_1 \\ \cdot \\ \cdot \\ \cdot \\ C_n \\ \cdot \\ \cdot \\ C_{N-1} \end{bmatrix} = \begin{bmatrix} \ldots\ldots & 1\ldots\ldots & 1\ldots\ldots & 1 \\ 1\ldots\ldots & W\ldots\ldots & W^2\ldots\ldots & W^{(2n-1)} \\ \cdot & \cdot & \cdot & \cdot \\ \cdot & \cdot & \cdot & \cdot \\ \cdot & \cdot & \cdot & \cdot \\ 1\ldots\ldots & W^n\ldots & W^{2n}\ldots & W^{(2N-1)n} \\ \cdot & \cdot & \cdot & \cdot \\ \cdot & \cdot & \cdot & \cdot \\ 1\ldots\ldots & W^{N-1} & W^{2(N-1)} & W^{(2N-1)(N-1)} \end{bmatrix} \times \begin{bmatrix} \sigma_o \\ \sigma_1 \\ \sigma_2 \\ \cdot \\ \cdot \\ \cdot \\ \cdot \\ \cdot \\ \sigma_{2N-1} \end{bmatrix} \quad (8)$$

In the system shown in FIG. 1 these complex Fourier coefficients Co, $C_1 \ldots C_{N-1}$ are calculated as follows: As already described the series-parallel converter 5 provides 2N parallel series of samples which samples occur within each series at a frequency 1/2T and mutually exhibit a phase shift of T/N. By indicating the samples of the multiplex signal of FIG. 2*b* in the manner shown in FIG. 3*b* by $S_{i+2Nk}$, the samples which occur at a given output of the converter 5 correspond to a given fixed value for the variable $i$, but the samples occurring successively at this output differ in the value of the variable index $k$.

For the purpose of illustration FIG. 3*c* shows the samples applied by the converter 5 and corresponding to the fixed value for $i$ namely $i = 0$ where $k$ is chosen to be variable between −P and P−1.

FIG. 3*d* shows such a series of samples for a given $i$ and for a $k$ variable between −P and P−1, that is to say, a series of samples supplied by the output lead $i$ of the converter 5.

These 2N series of samples stored in the register $r_o$–$r_{2.N-1}$ are simultaneously applied to the 2N calculators $A_i$ of the digital lowpass filter 2*a*. In these calculators the samples are multiplied in accordance with expression (6) by filter coefficients $a_{i+2Nk}$ for generating the sum signal samples $\sigma_i$ defined by this expression (6).

It is to be noted that the memory 6 in which all filter coefficients $a_{i+2Nk}$ are stored in a so-called ROM memory, that is to say, a read-only memory from which the 2N coefficients are derived at a frequency 1/2T.

It is also to be noted that in the described embodiment in which all calculators operate simultaneously the same coefficients can be used in different calculators so that in practice the memory may have a smaller capacity than that which corresponds to 2NP coefficients.

The signal sum samples $\sigma_o, \sigma_1 \ldots \sigma_{2N-1}$ are applied to the Fast Fourier transformer 7 for carrying out the operation defined by equation (7) or (8) for determining the complex Fourier coefficients $C_o$, $C_1$ . . . $C_{N-1}$. Any Fast Fourier transformer commercially available may be used. The operation of such a transformer is described, for example in an Article of Bellanger and Bonneval in l'Onde Electrique, vol. 48, no. 500, November 1968. This transformer provides the N complex Fourier coefficients for the determination of which only a minimum number of multiplications is required, which number is equal to $2N \log_2 N$ in the case where N is a power of 2. The coefficients cos $\pi i/N$ used in the Fast Fourier transformer may not only be provided by a separate memory 6a but also by the coefficient memory 6 which comprises a large number of coefficients for use in combination with the the calculators with a value located between −1 and +1. The Fast Fourier transformer 7 provides at a frequency 1/2T at its N independent pairs of output terminals $P_0$, $P_1$ . . . $P_{N-1}$ samples of the complex Fourier coefficient $C_o$, $C_1$ . . . $C_{n-1}$. The two output terminals of each pair, for example, the two terminals $p_{n1}$ and $p_{n2}$ of the pair $p_n$ provide the samples of the real part $\alpha_n$ and of the imaginary part $\beta_n$, respectively, of the complex coefficient $C_n$. As already noted the samples $\alpha_n$ constitute the phase component $\sigma(t)$ of the signal in channel no. *n* and as is known this component may be written in the form of $$\sigma(t) = s(t) \cos \frac{2\pi t}{4T} + sq(t) \cos \frac{2\pi t}{4T} \quad (9)$$

wherein $s(t)$ represents the elementary signal for channel no. *n* and $sq(t)$ represents the elementary quadrature signal.

As has also been noted, the samples $\alpha_n$ are samples of the quadrature component $\sigma q(t)$ of the signal in the channel no. *n* which component may be written in the form of:

$$\sigma q(t) = s(t) \sin \frac{2\pi t}{4T} - sq(t) \cos \frac{2\pi t}{4T} \quad (10)$$

The demodulators *do*, $d_1$ . . . $d_{N-1}$ which are connected to the pairs of outputs of the transformer 7 then provide, with the aid of the signal components $\sigma(t)$ and $\sigma q(t)$ the samples of the elementary signal $s(t)$, which samples, according to Shannon, must occur at a frequency of 1/T. The equivalent analog method (method of Weaver), which makes it possible to obtain the elementary signal $s(t)$ starting from the two components $\sigma(t)$ and $\sigma q(t)$ consists in that each of these components is first filtered and subsequently demodulated with carrier signals mutually shifted 90° in phase; this means with cos $2\pi t/4T$ and sin $2\pi t/4T$, respectively, whereafter the two output signals are combined.

The demodulators *do*, $d_1$ . . . $d_{N-1}$ are then a digital translation of the known analog quadrature demodulator. In the digital embodiment in FIG. 1 of the quadrature demodulators one digital filter is used for which a filter of the non-recursive type may be chosen. The demodulation process will be further described with reference to the demodulator $\alpha_n$ of FIG. 1 and the diagrams of FIG. 4. In FIG. 4 a series of six samples $\alpha_n$ is shown at *a* which samples occur with a period 2T and which are applied in the demodulator to a delay circuit 8 shifting the series over a constant time ΔT which is a multiple of 2T and thus provides the series of samples $\alpha'_n$ shown in FIG. 4b. The sample series $\beta_n$ likewise occurring with a period 2T is shown in FIG. 4c. These samples are applied to a digital filter 9 of the non-recursive type having a transfer function as shown in FIG. 2c. This filter 9 which thus has a cut-off frequency of 1/4T provides the series of samples $\beta'_n$ with a delay of ΔT as is shown in FIG. 4d. These samples are determined by the sum of products of the samples $\beta_n$ and filter coefficients which indicate the values of the pulse response of the filter at instants which do not coincide with the instants of occurrence of the samples $\beta_n$ but at instants which are located in the middle between two successive samples $\beta_n$ so that thus also the samples $\beta'_n$ occur in the middle between two successive samples $\beta_n$. The filter coefficients for this filter may also be derived from the memory 6 which in fact comprises the coefficients for the filter 2a characterizing a low-pass filter having a cut-off frequency of 1/4T.

The two series $\alpha'_n$ and $\beta'_n$ are subsequently applied to arrangements 10 and 11, respectively, which reverses the sign of every second sample, which in view of the fact that the two series $\alpha'_n$ and $\beta'_n$ are mutually shifted over a time T is the digital equivalent of a modulation by two carriers mutually shifted 90° in phase and each having a frequency of 1/4T. In FIGS. 4e and 4f the two series obtained in this manner are shown. In these Figures the + and − signs indicate the polarity of the relevant sample. These two series are subsequently combined in a combination device 12 which provides the series of samples shown in FIG. 4g. Thus samples of the elementary signal $s(t)$ transported by channel no. *n* are obtained at the output of the demodulator $\alpha_n$ with a frequency of 1/T.

All quadrature demodulators shown in FIG. 1 are identical and operate in the same manner. All of them simultaneously supply samples at a frequency of 1/T of the different elementary signals transported in the channels. In the above-mentioned example, which relates to a frequency division multiplex of a group of 60 telephony signals, the samples of the 60 baseband signals fed back to the frequency band of 0–4000 Hz occurring with the sampling frequency of 8000 Hz are obtained at the output of 60 demodulators.

FIG. 5 diagrammatically shows an embodiment of a calculator $A_i$ used in the filter 2a supplying the samples $\sigma_i$ which samples are determined in accordance with equation (6) i.e. using a series of 2P samples occurring at the output of the register $r_i$ and 2P filter coefficients of a group of 2 NP coefficients of a low-pass filter. In FIG. 3d this series of 2P samples is shown in accordance with:

$S_{i-2NP}$, $S_{i-2N(P-1)}$ . . . $S_i$ . . . $S_{i+2N(P-2)}$, $S_{i+2N(P-1)}$.

The filter coefficients are in this case also the values of the pulse response of FIG. 3a at the instants when these samples occur. These coefficients are indicated with the aid of the same index as that for the samples, for example, by:

$a_{1-2}NP$, $a_{i-2N(P-1)}$ . . . $a_i$ . . . $A_{i+2N(P-2)}$, $a_{i+2N(P-1)}$.

A sample $\sigma_i$ which is determined with the aid of these 2P input samples and these 2P coefficients has the value $$\sigma_i = (a.S)_{i-2NP} + (a.S)_{i-2N(P-1)} + \ldots + (a.S)_i + \ldots + (a.S)_{i+2N(P+2)} + (a.S)_{i+2N(P-1)} \quad (11)$$

In the circuit according to FIG. 5 the samples are applied through an input terminal 13, a cascade arrangement of an AND-gate 17 and an OR-gate 16 to a shift register 14. The output of this register is connected to its input through an AND-gate 17 and the OR-gate 16. The gate 15 is enabled during the period determined by a control signal applied to an input terminal 18. By using an inverter 19 the gate 17 is enabled in the absence of this control signal so that the register 14 then operates as a dynamic memory. the AND-gate 17 is provided with an input 23 through which it is possible to break down the word stores in the memory, which will be described hereinafter.

The output of register 14 is connected to a first input of 2P AND-gates $x_1, x_2 \ldots x_{2P}$ each having a second input which is connected to the coefficient memory 6 and to which the coefficients $a_{i-2NP}, a_{i-2N(P-1)} \ldots a_{i+2N(P-1)}$ are applied. The output of each of these AND-gates is connected to an input of adder $B_1, B_2 \ldots B_{2P}$ the outputs of which are connected to inputs of 2P shift registers $R_1, R_2, \ldots R_{2P}$, respectively. The output of the register $R_1$ is connected to a second input of the adder $B_1$ through the AND-gate $y_1$ and the outputs of the registers $R_2, R_3 \ldots R_{2P}$ are connected to second inputs of the adders $B_2, B_3 \ldots B_{2P}$ through AND-gates $y_2, y_3 \ldots y_{2P}$ and OR-gates $0_2, 0_3 \ldots 0_{2P}$, respectively. The AND-gates $y_1, y_2 \ldots y_{2P}$ are enabled in the absence of the control signal which is applied to the input terminal 18. Finally the output of each of the 2P—1 first registers $R_1, R_2 \ldots R_{2P-1}$ is connected to the second input of the adders $B_2, B_3 \ldots B_{2P}$ through the AND-gates $z_1, z_2 \ldots z_{2P-1}$ and the OR-gates $0_2, 0_3 \ldots 0_{2P}$, respectively. The output of the last register $R_{2P}$ is connected through an AND-gate $z_{2P}$ to the output terminal 20 of the calculator. The AND-gates $z_1, z_2 \ldots z_{2P}$ are enabled during the period when the control signal applied to terminal 18 is present.

The samples occurring with a period 2T which are applied via the input terminal 13 to the calculator and are coded into PCM words each comprising a given number of bits (for example, 12) which are applied in series and in the rhythm of a local clock pulse to this input 13, the bit having the slightest weight coming first. The 2P so-called multiplier registers $R_1, R_2 \ldots R_{2P}$ each include a number of $D_1$ elements which is larger than the number of bits of a sample. The register 14 includes a number of $D_2$ elements which is equal to $D_1$—1. In a practical case these values are, for example, $D_1$=20 and $D_2$=19.

The operation of the circuit of FIG. 5 is effected under the control of the control signal applied to terminal 18. This signal which has the same period 2T as the samples is shown in FIG. 6*a* starting at the instant $t_1$ when the first bit of the first sample $S_{i-2NP}$ is applied to the input 13. During a first time interval $(t_1, t'_1)$ when the control signal has a value which will be indicated by 1 the gate 15 is enabled, the gate 17 is blocked and this bit of the sample $S_{i-2NP}$ is introduced into the register 14 in the rhythm of a local clock pulse. In the example chosen the interval $(t_1, t'_1)$ has 16 clock periods. At the instant $t'_1$ the first bit appears, namely that of the slightest weight of the total numer of $D_1$ = 20 bits at the output of the register 14, which bit is subsequently applied to the first input of each of the AND-gates $x_1, x_2 \ldots x_{2P}$.

At the instant $t'_1$ the control signal assumes a value which will be indicated by 0. At this instant the gate 15 is blocked and the gate 17 is enabled. The AND-gate is not only blocked by the control signal but also by a blocking signal occurring at its input 23 with a periodicity of $D_1$ local clock pulses and every time it blocks this AND-gate 17 when the bit of the slightest weight occurs at the output of register 14. Thus from the instant $t'_1$ to the instant $t_2$ when again a 1 of the control signal occurs, the memory 14 operates as a dynamic memory in which for each period equal to $D_1$ local clock pulses the stored word is divided by 2.

Since during this interval $(t'_1, t_2)$ the gates $z_1, z_2 \ldots z_{2P}$ are blocked so that the outputs of the registers $R_1, R_2 \ldots R_{2P}$ are not connected to the output 20 while the gates $y_1, y_2 \ldots y_{2P}$ are not blocked, the registers $R_1$–$R_{2P}$ operate as dynamic memories. During this time interval $(t'_1, t_2)$ the multiplications of the sample $S_{i-2NP}$ by the coefficients $a_{i-2NP}, a_{i-2N(P-1)} \ldots a_{i+2N(P-1)}$, are performed so that at the instant $t_2$ a word is written in each register $R_1$–$R_{2P}$ constituted by the sum of a word obtained by multiplication and a word already written in the register.

During this interval $(t'_1, t_2)$ the bits of the filter coefficients are derived from the memory 6 and are applied in series to the second input of the gates $x_1, x_2 \ldots x_{2P}$, the bit of the highest weight coming first. The number of bits of each coefficient is, for example, 12 and the duration of each bit is, for example, 20 local clock pulses which is equal to the duration of $D_1$ clock periods of the registers $R_1$–$R_{2P}$. FIG. 6 diagrammatically shows how in the register $R_1$ the product $a_{i-2NP}. S_{i-2NP} = (a.S)_{i-2NP}$ is realized. To this end FIG. 6 shows at *b* a series of 12 bits $e_1, e_2 \ldots e_{12}$ of the coefficient $a_{i-2NP}$ which series is applied to the second input 21 of the gate $x_1$. During the time when the first bit $e_1$ of, for example, the highest weight is applied to this input 21 all bits of the sample $S_{i-2NP}$ appear at the first input 22 of the gate $x_2$ and dependent on whether $e_1$ has the value 1 or 0 the sample (in word form) is written in or not written in register $R_1$. The starting point in this case is that this register is empty at the commencement of the multiplication operation. In the period constituted by 20 clock periods during which the second bit $e_2$ of the filter coefficient is applied to the AND-gate $x_1$ this register, with a view to the fact that the register 14 includes only 19 elements, applies a binary word to the second input 22 of the gate $x_1$ which word corresponds to half the value of the latest considered sample $S_{i-2NP}$. Dependent on whether the bit $e_2$ has the value 1 or 0, the gate $x_1$ applies or does not apply this half sample value $\frac{1}{2}S_{i-2NP}$ to an input of the adder $B_1$ to which the latest considered sample value $S_{i-2NP}$ is applied through the other input, which value is written in $R_1$. This adder $B_1$ forms the sum of the two applied sample values $S_{i-2NP}$ and $\frac{1}{2}S_{i-2NP}$ which sum is written in the register $R_1$.

This process is subsequently repeated with the aid of the other bits of the filter coefficient $a_{i-2NP}$ at which the value of the sample is halved by shifting relative to the latest value used so that at the instant $t_2$ the complete product $a_{i-2NP}.S_{i-2NP}$ is written in the register $R_1$.

In this first interval $(t'_1, t_2)$ the multiplication of the sample $S_{i-2NP}$ by the other coefficients $a_{i-2N(P-1)} \ldots a_{i+2N(P-1)}$ is simultaneously performed by using the registers $R_2 \ldots R_{2P}$ in the same manner while outputs of these registers are connected to adders $B_2$–$B_{2P}$, the only difference being that these registers are generally not empty at the instant of commencement $t'_1$ of the interval so that each register at the end of the interval retains its initial contents at the instant $t_2$ with the addition of the result of the multiplication. For determining the value of the sample $\tau_i$ it is, however, sufficient to indicate the contents of the register $R_1$ at the instant $t_2$ of this interval. These contents are shown in FIG. 6 on the line $R_1$ by the indication $(a.S)_{i-2NP}$.

During the second 1 pulse of the control signal which occurs at the time interval $(t_2, t'_2)$ the second sample $S_{i-2N(P-1)}$ is written in register 14. In addition this 1 pulse blocks the gates $y_1, y_2 \ldots y_{2P}$ and it enables the gates $z_1, z_2 \ldots z_{2P}$ so that the contents of each of the registers $R_1$, Rhd 2 . . . $R_{2P-1}$ in the interval $(t_2, t'_2)$ are shifted to the respective registers $R_2, R_3 \ldots R_{2P}$. In FIG. 6 the shift of the contents $(a.S)_{i-2NP}$ from $R_1$ to $R_2$ is indicated by a slanting arrow.

During the interval $(t'_2, t_3)$ the second sample $S_{i-2N(P-1)}$ is multiplied by the filter coefficients. For the register $R_2$ this means, for example, that the contents of this register at the end of this time interval are formed by the sum of the product $(a.S)_{i-2N(P-1)}$ shown in FIG. 6 on line $R_2$ and the product $(a.S)_{i-2NP}$ shifted in this register.

In the same manner the third sample $S_{i-2N(P-2)}$ is written in the register 14 during the third 1 pulse occurring in the interval $(t_3, t'_3)$ of the control signal and the contents $(a.S)_{i-2NP} + (a.S)_{i-2N(P-1)}$ are shifted from $R_2$ to register $R_3$. Subsequently the product $(a.S)_{i-2N(P-2)}$ is formed and added in the register $R_3$ to the initial contents.

The successive operations of this kind thus result in that the $(2P)^{th}$ 1 pulse of the control signal occurring in the time interval $(t_{2P}, t'_{2P})$ writes the contents $(a.S)_{i-2NP} + (a.S)_{i-2N(P-1)} + \ldots + (a.S)_{i+2N(P-2)}$ of the register $R_{2P-1}$ in the register $R_{2P}$ and in the multiplication interval immediately following this interval the product $(a.S)_{i+2N(P-1)}$ is added to the initial contents of $R_{2P}$.

The register $R_{2P}$ thus includes the sample $\tau_i$ represented by equation (11). This sample will be derived from the output 20 of the calculator under the control of the 1 pulse of the control signal occurring during the interval $(t_{2P+1}, t'_{2P+1})$.

The calculator shown in FIG. 5 is particularly suitable for large scale integration in which this circuit may be manufactured with MOs techniques and multiple logic. This circuit actually satisfied in an optimum manner all requirements which are to be imposed thereon in order to be formed in this technique. It includes, for example, a minimum number of connections because all operations are performed on numbers with series bits; the multiplications are performed in series with only a limited number of elements and the required clock frequency is relatively low.

In the example described above in which the registers $R_1$–$R_{2P}$ comprise 20 elements and the coefficients consist of 12 bits the time additionally required for multiplying a sample by the filter coefficients is $12 \times 20$ local clock periods. The time required for writing the sample in the input register 14 is 16 local clock periods so that the time interval 2T is to comprise a total of $(12 \times 20) + 16 = 256$ local clock periods. For a baseband channel signal having a bandwidth of $\Delta f$ of 4 kHz the interval 2T is equal to 1/4000 second. For performing the multiplications a clock frequency is required of $4 \times 256 = 1024$ kHz which is a value eminently adapted for realizing the calculator as an integrated MOS circuit.

FIG. 7 shows a single sideband system for converting N baseband channel signals into a frequency division multiplex signal. To this end this system includes an input circuit 30*a* having N inputs leads $i_o, i_1 \ldots i_{N-1}$ each of which is connected to an analog-to-digital converter $E_0$–$E_{N-1}$ providing the coded samples (PCM words) of a channel signal located in the frequency band of $(0 - 1Y/2T)$. The frequency at which the samples occur is chosen to be equal to 1/T in accordance with Shannon.

In this system the synchronously operated analog-to-digital converters $E_0$–$E_{N-1}$ supply samples of the baseband channel signals coded with 12 bits. These channel signals are formed, for example, by telephony signals in the frequency band of from 0 to 4000 Hz and are sampled in the converter $E_0$–$E_{N-1}$ at a frequency of 8000 Hz. For realizing a frequency division multiplex signal in which only one modulation sideband occurs of all modulated channel signals, the same digital operations as in the system according to FIG. 1 are performed in this digital system, though in reverse order. More particularly the samples of the N baseband channel signals are applied to N quadrature modulators $M_o, M_1 \ldots M_{N-1}$ performing the same operations on the applied samples as the quadrature demodulators $d_o \ldots d_1 \ldots d_{N-1}$. These operations are shown in FIG. 4 in which, however, the diagrams are to be read from *g* to *a*.

As is shown in greater detail for the modulator Mn to which the samples (FIG. 4*g*) of a baseband channel signal $s(t)$ are applied, each of these modulators has an inverter contact 25 at its input which supplies two interleaved series of samples in each of which the samples occur at a frequency of 1/2T. In each of these series the sign of one of every two samples is reversed with the aid of the circuits 26 and 27 (FIGS. 4*e* and 4*f*) which is equivalent to modulating the signal $s(t)$ with two mutually 90° phase-shifted carriers cos $2\pi t/4T$ and sin $2\pi t/4T$ each having a frequency of 1/4T (half the frequency band $0 - 1/2T$ of the signal $s(t)$. Starting from the series of samples supplied by the circuit 27 the samples which characterize the value of the information signal at the instants located between two successive supplied samples are determined with the aid of the lowpass filter 29 which is chosen to be of the non-recursive type having a cut-off frequency of 1/4T and this by determining the sum of products of a given number of samples and filter coefficients characterizing the filter. Likewise as in FIG. 1 these samples are again obtained with a delay time ΔT. The delay circuit 28 shifts with the same time ΔT the series of samples which are supplied by the circuit 26. Thus two series of samples $\alpha_n$ and $\beta_n$ are derived from the output of the modulator Mn which series represent the samples of the phase component $\sigma(t)$ and quadrature component $\sigma q(t)$ of the signal in the $n^{th}$ channel of the multiplex signal. These components $\sigma(t)$ and $\sigma q(t)$ are likewise given by the expressions (9) and (10). The series $\alpha_n$ and $\beta_n$ may furthermore be considered as the real and imaginary parts of the complex Fourier coefficient $C_n^k$ of the signal which is transmitted in the channel no. *n* of the multiplex signal. This coefficient may be written as $C_n^8 = \alpha_n + j_n^\beta$ of the interval having an length of 2T and *k* passes through all integral values from to P−1.

With the same consideration as that corresponding to the system according to FIG. 1 it is found that in a given time interval having a length of 2T (given value for *k*) each of the 2N samples of the multiplex signal can be written as $$S_i = \sum_{K=-P}^{P-1} a_{i+2Nk} x \text{ real part} \sum_{n=o}^{N-1} C_n k.\exp [j2\pi in/2N] \qquad (12)$$

In this expression (12) $i$ assumes all integral values from 0 to 2N−1 and likewise as in the foregoing $a_{i+2NK}$ represents a coefficient of a lowpass filter having a cut-off frequency of 1/4T. Of this expression the second expression is firstly determined likewise as in the foregoing with the aid of a Fast Fourier transformer 30 which starting from N complex Fourier coefficients $C_o^k$, $C_1^k$ . . . $C_n^k$ . . . $C_{N-1}^k$ determines 2N complex numbers of which exclusively the real parts $\alpha_o^k$, $\alpha_1^k$ . . . $\alpha_n^k$ . . . $\alpha_{2N-1}^k$ are utilized for the further operations.

By writing $W = \exp\,[j\pi/N]$ the operation to be performed can in matrix form be expressed as follows:

of read pulse signals $L_o$, $L_1$ . . . $L_{2N-1}$ which mutually have a time shift of T/N and which each occur at a frequency of 1/2T.

For the samples of a frequency division multiplex signal located in the frequency band [0 − N/2T] occur in this common lead 32 at a frequency of N/T. In order to obtain this signal, whose frequency diagram is shown in FIG. 2*b*, in an analog form these samples are applied to the digital-to-analog converter 33 which converts the incoming words into amplitude-modulated pulses which are applied to the bandpass filter 34 supplying an analog signal having a frequency diagram according to $$\begin{bmatrix} \sigma_o^k \\ \sigma_1^k \\ \cdot \\ \cdot \\ \sigma_i^k \\ \cdot \\ \cdot \\ \sigma_{2N-1}^k \end{bmatrix} = \text{real part of} \begin{bmatrix} 1 & 1 & 1 \ldots\ldots & 1 \\ 1 & W & W^2 \ldots\ldots & W^{N-1} \\ \cdot & \cdot & \cdot & \cdot \\ \cdot & \cdot & \cdot & \cdot \\ 1 & W^i & W^{2i} \ldots\ldots & W^{(N-1)i} \\ \cdot & \cdot & \cdot & \cdot \\ \cdot & \cdot & \cdot & \cdot \\ 1 & W^{2N-1} & W^{2(2N-1)} & W^{(N-1)(2N-1)} \end{bmatrix} \times \begin{bmatrix} C_o^k \\ C_1^k \\ \cdot \\ \cdot \\ C_n^k \\ \cdot \\ \cdot \\ C_{N-1}^k \end{bmatrix} \quad (13)$$

Starting from 2P real numbers $\sigma_i^k$ the 2N samples $S_i$ are subsequently determined which occur in a time interval 2T. It follows from the expression (12) that these samples $S_i$ may be written as:

$$S_i = \sum_{k=-P}^{P-1} a_{i+2Nk}\ \sigma_i^k \quad (14)$$

On the one hand the complex Fourier coefficients $C_o^k$, $C_1^k$ . . . $C_{N-1}^k$ occurring at the frequency of 1/2T at the outputs of the modulators $M_o$–$M_{N-1}$ are applied to the Fast Fourier transformer 30 shown in FIG. 7 and on the other hand carrier signal functions $W^r$ originating from a memory 31*a* are applied to this Fast Fourier transformer wherein $r$ = 1, 1, . . . (N−1)(2N−1). The Fast Fourier transformer 30 performs the operations defined by equations (13) and provides through its 2N output leads 2N series of real numbers $\sigma_o^k$, $\sigma_1^k$ . . . $\sigma_{2N-1}^k$ which numbers occur with the frequency of 1/2T at each of the output leads. These 2N series are subsequently applied to a lowpass filter 32*a* which is constituted by 2N calculators $H_o$, $H_1$ . . . $H_{2N-1}$ to which one of the series $\sigma_i^k$ and in addition filter coefficients $a_{i+2Nk}$ originating from a memory 31 are applied. In these calculators the numbers $\sigma_o^k$, $\sigma_1^k$, $\sigma_{2N-1}^k$ are multipled by filter coefficients $a_{i+2Nk}$ in accordance with expression (14). These calculators which together constitute a lowpass filter having a cut-off frequency of 1/4T may be formed in the same manner as those in FIG. 1 and a detailed embodiment of these calculators is shown in FIG. 5.

Likewise as in the system of FIG. 1 the coefficients from the memory 31 may also be used for the operations to be performed in the circuit 30 and for the lowpass filters 29 in the modulators $M_o$–$M_{M-1}$.

In the described system the 2N calculators $H_o$–$H_{2N-1}$ supply 2N simultaneous series of samples $S_i$. For interleaving these series the output of each of the calculators $H_o$–$H_{2N-1}$ is connected in the output circuit 33*a* to a register $r_o$, $r_i$ . . . $r_{2N-1}$ each having a capacity corresponding to the number of bits of the sample at the output of the calculator. The samples in the registers $r_o$, $r_1$ . . . $r_{2N-1}$ are successively applied to the common output lead 32 through AND-gates $h_o$, $h_1$ . . . $h_{2N-1}$ with the aid FIG. 2*b*. The desired location of the frequency division multiplex signal is obtained with the aid of a modulator 35 to which a carrier signal of the frequency $F_2 - \Delta f/2$ wherein ($\Delta f = 1/2T$) is applied. The frequency division multiplex signal is thus transposed in frequency to a frequency band $F_3$–$F_4$ having a width of N$\Delta f$. FIG. 2*a* shows this transposition in a diagram.

FIGS. 8 and 9 show some important possibilities of use of the systems according to the invention. The transmission system shown in FIG. 8 for frequency division multiplex signals is provided with a transmitter 40 and a receiver 41 which are connected together, for example, through a coaxial cable. In the transmitter 40 which is built up in the manner as is shown in FIG. 7 a number of baseband channel signals, for example, speech signals is converted into a frequency division multiplex signal which is transmitted through the transmission lead to the receiver 41 build up in the manner as is shown in FIG. 1 and in which the received multiplex signal is converted into the original baseband channel signals.

FIG. 9 shows an intermediate station 40,41 establishing a connection between a single sideband frequency division multiplex transmission system and a time division multiplex transmission system. More particularly the frequency division multiplex signals which are transmitted by a terminal station 50 of the frequency division multiplex transmission system are applied to a single sideband system 41 which is built up in the manner as is shown in FIG. 1 and are converted in this system into a number of baseband channel signal samples which are combined in an arrangement 52 and are subsequently transmitted through a transmission lead to a terminal station 51 of a time division multiplex transmission system. Conversely, the time division multiplex signals transmitted by the terminal station 51 are applied through a transmission lead to a single sideband system 40 which is built up in the manner as is shown in FIG. 7 where the samples of baseband signals transmitted in time division multiplex are applied through a series-parallel converter to the system 40 for conversion of these baseband channel signals into a frequency division multiplex signal which is transmitted through a transmission line to the terminal station 50 of the single sideband frequency division multiplex transmission system.

What is claimed is:

1. A single sideband system for digitally processing a given number of analog channel signals each having a given bandwidth, said system comprising an input circuit including a converter means for sampling and converting the channel signals into a number of digital signals; a cascade arrangement coupled to said input circuit and including a Fast Fourier transformer means and a digital filter coupled to said transformer means, said digital signals being applied to said cascade arrangement; a source for generating signals representative of a given number of filter coefficients coupled to said digital filter, said filter coefficients characterizing the transfer function of a lowpass filter having a cut-off frequency which is equal to half the bandwidth of said channel signals; a source for a given number of carrier signal functions coupled to said transformer means, said number of carrier signal functions being at least equal to twice the number of channel signals, said carrier functions representing carrying frequencies each being an even multiple of the cut-off frequency of said lowpass filter said analog channel signals comprising a given number of baseband channel signals, said input circuit including a number of parallel signal channels, said number corresponding to the number of baseband signal channels, each of said channels including a converter means for sampling each baseband channel signal with the associated Nyquist frequency, said signal channels each including a modulator coupled to said converter means, the transformer means having inputs coupled to said modulators for generating a number of first sum signals each being proportional to the sum of products of output signals from said modulator and carrier signal functions, said transformer means having a number of output leads which number is equal to the number of first sum signals, said output leads being coupled to the digital filter, said filter having a number of signal channels said number corresponding to the number of output leads, each signal channel being coupled to the number of output leads and each including a convolution means coupled to said filter coefficient source for generating a second sum signal which is proportional to the sum of products of first sum signals and filter coefficients applied to said convolution means, means for applying said second sum signals in the rhythm of successively occurring read signals to a common output lead for generating a frequency division multiplex signal in an auxiliary frequency band, an output circuit, means for applying said multiplex signal to said output circuit, said output circuit comprising a digital-to-analog converter and a second modulator means coupled to said digital to analog converter for transposing said frequency division multiplex signal from the auxiliary frequency band to said given frequency band.

2. A single sideband system as claimed in claim 1, wherein the modulator in the input circuit comprises a number of quadrature modulators each of which is incorporated in a signal channel, said quadrature modulators each including means for providing two phase-shifted carrier-modulated channel signals, the transformer means comprising a number of input means coupled to said quadrature modulators equal to an integral power of two and a number of output leads corresponding to this number.

3. A single sideband system for digitally processing a given number of analog channel signals each having a given bandwidth, said system comprising an input circuit including a converter means for sampling and converting the channel signals into a number of digital signals; a cascade arrangement coupled to said input circuit and including a Fast Fourier transformer means and a digital filter coupled to said transformer means, said digital signals being applied to said cascade arrangement; a source for generating signals representative of a given number of filter coefficients coupled to said digital filter, said filter coefficients characterizing the transfer function of a lowpass filter having a cut-off frequency which is equal to half the bandwidth of said channel signals; a source for a given number of carrier signals functions coupled to said transformer means, said number of carrier signals functions being at least equal to twice the number of channel signals, said carrier functions representing carrying frequencies each being an even multiple of the cut-off frequency of said lowpass filter said analog channel signals comprising a single-sideband frequency division multiplex signal located in a given frequency band, said input circuit including a modulator having a first input means for receiving frequency division multiplex signal, a second input means for receiving a carrier signal, and an output means for providing a frequency division multiplex signal whose lowest frequency corresponds to an odd multiple of the cut-off frequency of said lowpass filter, the converter means sampling at a frequency which is equal to the Nyquist frequency of said signal and having an input coupled to said modulator output and an output, said input circuit furthermore including a series-to-parallel converter comprising an input coupled to said converter means output and a given number of output leads which number is equal to the ratio between said Nyquist frequency and the bandwidth of a baseband channel signal; said digital filter in said single sideband system including a number of parallel signal channels each being coupled to an output lead of the series-to-parallel converter and each including a convolution means coupled to said filter coefficient source for generating a first sum signal which is proportional to the sum of the products of signals and filter coefficients applied to said arrangement and having an output, said transformer means being coupled to said convolution means output for generating a number of second sum signals each being proportional to the sum of products of said first sum signals and carrier signal functions, an output circuit including a demodulator means coupled to said transformer means for demodulating said second sum signals and for generating baseband signals each corresponding to a signal in a given frequency band of the frequency division multiplex signal.

4. A single sideband system as claimed in claim 3, wherein the number of output leads of the series parallel converter is an integral power of two and that the Fast Fourier Transformer has a number of pairs of output leads corresponding to the number of channel signals, the output leads of each pair comprising means for providing phase-shifted modulated signals, each pair of output leads being connected to the demodulator, the demodulator in said single sideband system comprising a number of quadrature demodulators, said number corresponding to said number of pairs of output leads, an input circuit of each of said quadrature demodulators being coupled to one of said pairs of output leads.

* * * * *